US010361581B2

(12) United States Patent
Maalouf et al.

(10) Patent No.: US 10,361,581 B2
(45) Date of Patent: Jul. 23, 2019

(54) BATTERY CHARGER POWER CONTROL

(71) Applicant: QUALCOMM Incorporated, San Diego, CA (US)

(72) Inventors: Joseph Maalouf, San Diego, CA (US); Sumukh Shevde, Carlsbad, CA (US); Curtis Gong, San Diego, CA (US); Christian Sporck, Campbell, CA (US); Cheong Kun, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 87 days.

(21) Appl. No.: 15/653,264

(22) Filed: Jul. 18, 2017

(65) Prior Publication Data

US 2018/0138735 A1    May 17, 2018

Related U.S. Application Data

(60) Provisional application No. 62/423,067, filed on Nov. 16, 2016.

(51) Int. Cl.
*H02J 7/04*   (2006.01)
*H02J 7/02*   (2016.01)
(Continued)

(52) U.S. Cl.
CPC ............ *H02J 7/045* (2013.01); *H02J 7/025* (2013.01); *H02J 50/12* (2016.02); *H04B 5/0037* (2013.01); *H02J 50/80* (2016.02)

(58) Field of Classification Search
CPC ....................................... H02J 7/045
(Continued)

(56) References Cited

U.S. PATENT DOCUMENTS

2011/0273130 A1   11/2011   Lee et al.
2015/0130394 A1   5/2015    Chang
(Continued)

FOREIGN PATENT DOCUMENTS

CN         102437629 A       5/2012

OTHER PUBLICATIONS

Nguyen C.L., et al., "An Effective Control Scheme for Battery Charger System in Electric Vehicles," Sep. 18-21, 2012, 2 pages.

*Primary Examiner* — Suresh Memula
(74) *Attorney, Agent, or Firm* — Patterson & Sheridan, LLP

(57) ABSTRACT

Certain aspects of the present disclosure relate to methods and apparatus for limiting the power drawn by a battery charger based on monitoring of the input voltage and input current supplied to the battery charger from a power supply. In certain aspects, a method generally includes sensing an output voltage of the power supply, wherein the output voltage of the power supply is variable. The method further includes sensing an output current of the power supply. The method further includes providing the output voltage and output current to a battery charger. The method further includes generating a control signal indicative of a scaling of the output current based on a scaling factor, wherein the scaling factor is based on the output voltage. The method further includes providing the control signal to the battery charger to control the output current supplied by the power supply to the battery charger.

30 Claims, 5 Drawing Sheets

(51) Int. Cl.
*H02J 50/12* (2016.01)
*H04B 5/00* (2006.01)
*H02J 50/80* (2016.01)

(58) Field of Classification Search
USPC .......................................................... 320/108
See application file for complete search history.

(56) References Cited

U.S. PATENT DOCUMENTS

| | | |
|---|---|---|
| 2015/0303807 A1 | 10/2015 | Garvey et al. |
| 2016/0233666 A1* | 8/2016 | Witcher ................. H02H 9/025 |
| 2017/0063118 A1* | 3/2017 | Kohout ................. H02J 7/0052 |
| 2018/0083456 A1* | 3/2018 | Huang .................... H02J 7/007 |

* cited by examiner

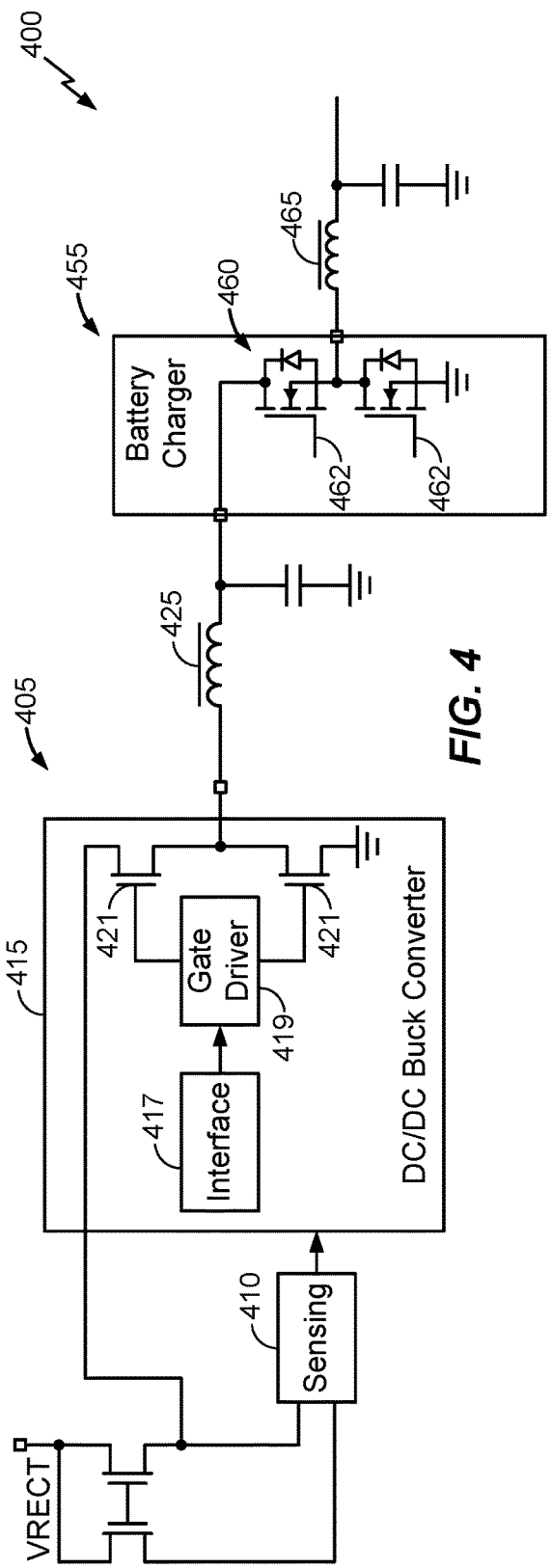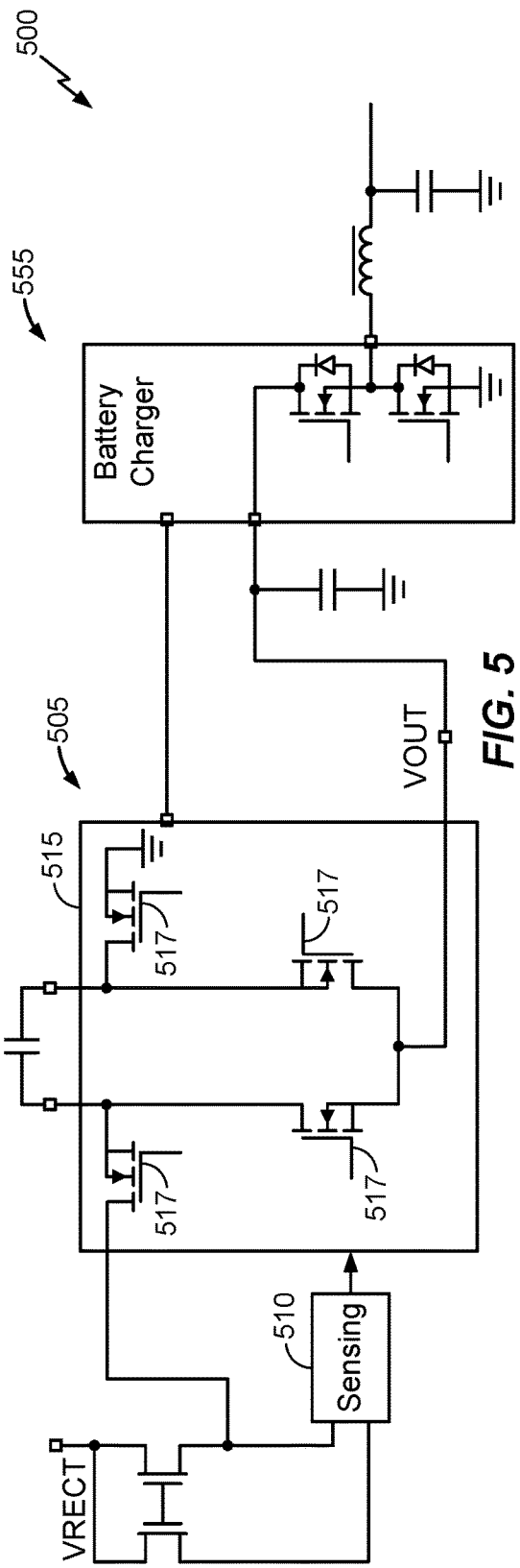
FIG. 4
FIG. 5

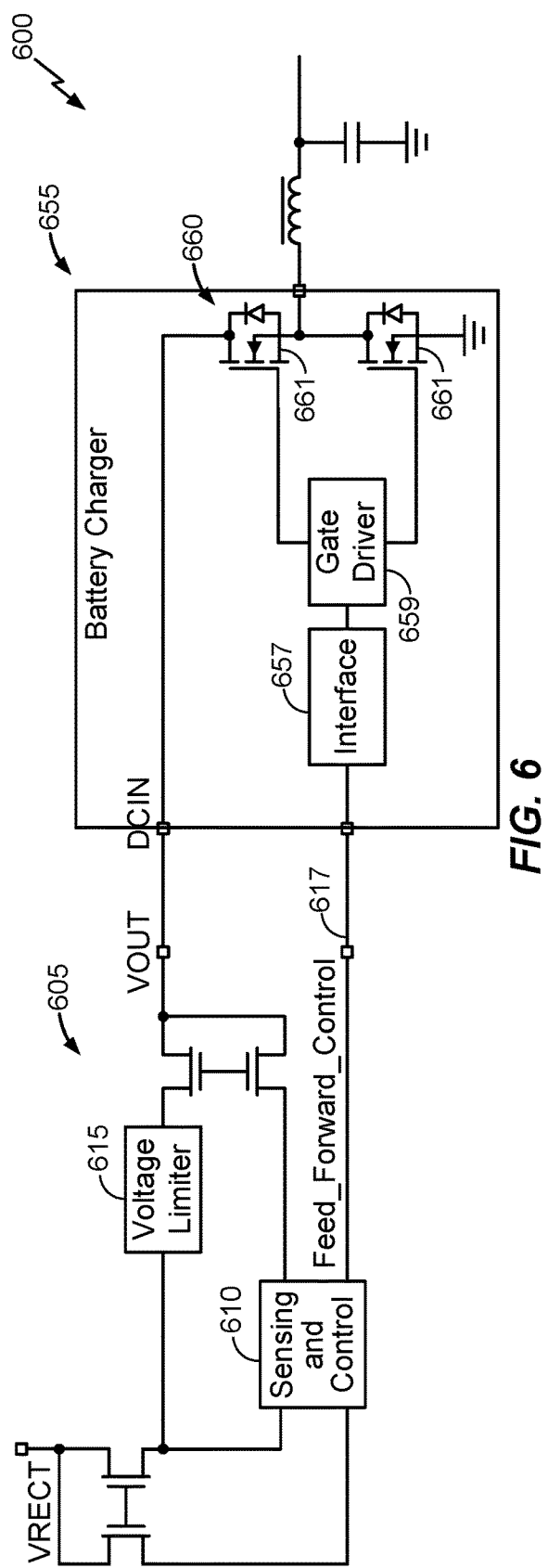
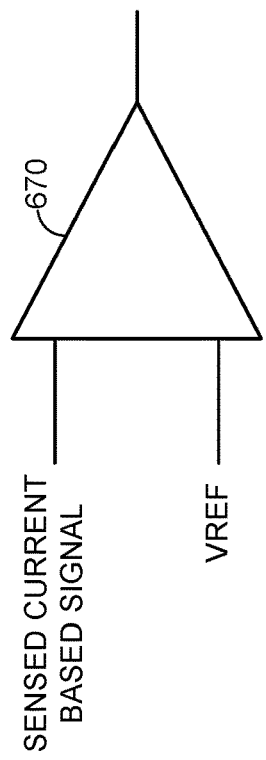
FIG. 6
FIG. 6A

BATTERY CHARGER POWER CONTROL

CROSS-REFERENCE TO RELATED APPLICATIONS

This application claims the benefit of U.S. Provisional Patent No. 62/423,067, filed Nov, 16, 2016. The content of the provisional application is hereby incorporated by reference in its entirety.

TECHNICAL FIELD

The present disclosure relates generally to power supply control, and in particular to limiting the power drawn by a battery charger based on monitoring of the input voltage and input current supplied to the battery charger from a power supply.

BACKGROUND

An increasing number and variety of electronic devices are powered via rechargeable batteries. Such devices include mobile phones, portable music players, laptop computers, tablet computers, computer peripheral devices, communication devices (e.g., Bluetooth devices), digital cameras, hearing aids, medical implants, and the like. While battery technology has improved, battery-powered electronic devices increasingly require and consume greater amounts of power. As such, these devices constantly require recharging.

Rechargeable devices may be charged via wired connections that require cables or other similar connectors that are physically connected to a power supply. In other cases, rechargeable devices may be charged wirelessly. Wireless power transfer systems, for example, may allow users to charge and/or power electronic devices without physical, electrical connections.

The batteries in the rechargeable device may be configured to be charged at particular power levels or voltages. Accordingly, systems and methods for controlling the power supplied to a battery may be desirable.

SUMMARY

Certain aspects provide a method for supplying power to a battery charger. The method generally includes sensing an output voltage of a power supply, wherein the output voltage of the power supply is variable. The method further includes sensing an output current of the power supply. The method further includes providing the output voltage and output current to the battery charger. The method further includes generating a control signal indicative of a scaling of the output current based on a scaling factor, wherein the scaling factor is based on the output voltage. The method further includes providing the control signal to the battery charger to control the output current drawn from the power supply by the battery charger.

Certain aspects provide a power supply for supplying power to a battery charger. The power supply generally includes an output terminal configured to provide an output voltage and output current to the battery charger. The power supply further includes a sensing circuit configured to sense the output voltage and the output current. The power supply further includes a control circuit configured to generate a control signal indicative of a scaling of the output current based on a scaling factor, wherein the scaling factor is based on the output voltage, and provide the control signal to the battery charger to control the output current to the battery charger.

Certain aspects provide a power supply for supplying power to a battery charger. The power supply generally includes means for sensing an output voltage of the power supply, wherein the output voltage of the power supply is variable. The power supply further includes means for sensing an output current of the power supply. The power supply further includes means for providing the output voltage and output current to the battery charger. The power supply further includes means for generating a control signal indicative of a scaling of the output current based on a scaling factor, wherein the scaling factor is based on the output voltage. The power supply further includes means for providing the control signal to the battery charger to control the output current drawn from the power supply by the battery charger.

Certain aspects provide a computer readable medium having instructions stored thereon for causing a power supply to perform a method for supplying power to a battery charger. The method generally includes sensing an output voltage of the power supply, wherein the output voltage of the power supply is variable. The method further includes sensing an output current of the power supply. The method further includes providing the output voltage and output current to the battery charger. The method further includes generating a control signal indicative of a scaling of the output current based on a scaling factor, wherein the scaling factor is based on the output voltage. The method further includes providing the control signal to the battery charger to control the output current drawn from the power supply by the battery charger.

The following detailed description and accompanying drawings provide a better understanding of the nature and advantages of the present disclosure.

BRIEF DESCRIPTION OF THE DRAWINGS

With respect to the discussion to follow and in particular to the drawings, it is stressed that the particulars shown represent examples for purposes of illustrative discussion, and are presented in the cause of providing a description of principles and conceptual aspects of the present disclosure. In this regard, no attempt is made to show implementation details beyond what is needed for a fundamental understanding of the present disclosure. The discussion to follow, in conjunction with the drawings, makes apparent to those of skill in the art how embodiments in accordance with the present disclosure may be practiced. In the accompanying drawings:

FIG. 4 illustrates a battery charging system including a buck converter, in accordance with certain aspects.

FIG. 5 illustrates a battery charging system including an open loop charge pump, in accordance with certain aspects.

FIG. 6 illustrates a battery charging system including a feed forward control system, in accordance with certain aspects.

FIG. 6A illustrates a control loop error amplifier for use with the battery charging system of FIG. 6, in accordance with certain aspects.

DETAILED DESCRIPTION

Figure 1:
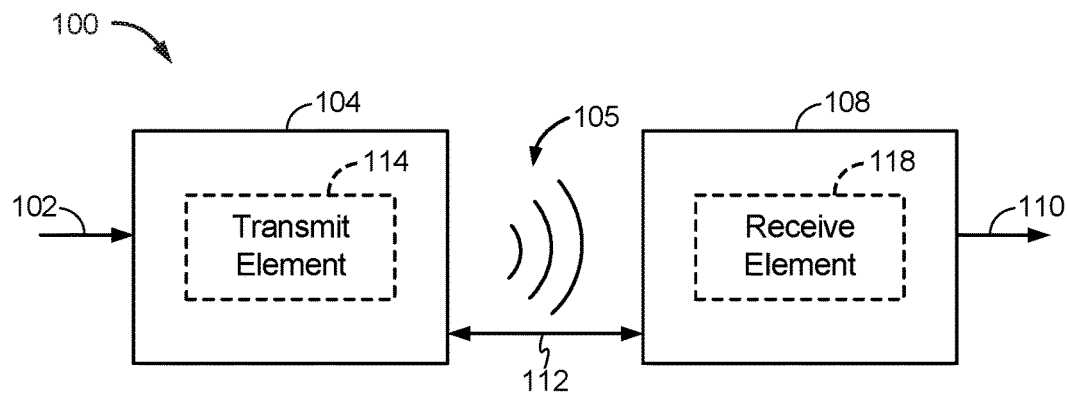
FIG. 1 is a functional block diagram of a wireless power transfer system in accordance with an illustrative aspect.

Drawing elements that are common among the following figures may be identified using the same reference numerals.

To charge a battery, a power supply may be coupled to a battery charger and the battery charger may be coupled to the battery. Accordingly, the battery charger can regulate the amount of power from the power supply that is applied to the battery for charging the battery.

In certain cases, a power supply may have a maximum power it can supply, and a battery charger may have a maximum power it can receive as input. Further, the voltage output from the power supply may vary (e.g., due to different charging profiles, fluctuations in a supply voltage to the power supply, variations in induced voltage in a wireless power supply, etc.). Accordingly, some aspects herein relate to limiting the power drawn by a battery charger from a power supply based on monitoring of the input voltage and input current supplied to the battery charger from the power supply. Such limiting of the power drawn by the battery charger can help prevent the power supply and battery charger from exceeding their respective maximum power limits.

In some aspects, the power supply is a wired power supply. For example, the power supply may include an AC/DC power adapter that plugs into a main power supply and provides a DC output. The wired power supply may have a wired connection (e.g., via a USB interface) to a charging port of a rechargeable device that is coupled to the battery charger inside the rechargeable device.

In some aspects, the power supply is a wireless power supply, such as described below with respect to FIGS. 1-3.

Wireless power transfer may refer to transferring any form of energy associated with electric fields, magnetic fields, electromagnetic fields, or otherwise from a transmitter to a receiver without the use of physical electrical conductors (e.g., power may be transferred through free space). The power output into a wireless field (e.g., a magnetic field or an electromagnetic field) may be received, captured by, or coupled by a "power receiving element" to achieve power transfer.

FIG. 1 is a functional block diagram of a wireless power transfer system 100, in accordance with an illustrative aspect. Input power 102 may be provided to a transmitter 104 from a power source (not shown in this figure) to generate a wireless (e.g., magnetic or electromagnetic) field 105 for performing energy transfer. A receiver 108 may couple to the wireless field 105 and generate output power 110 for storing or consumption by a device (not shown in this figure) coupled to the output power 110. The transmitter 104 and the receiver 108 may be separated by a distance 112. The transmitter 104 may include a power transmitting element 114 for transmitting/coupling energy to the receiver 108. The receiver 108 may include a power receiving element 118 for receiving or capturing/coupling energy transmitted from the transmitter 104.

In one illustrative aspect, the transmitter 104 and the receiver 108 may be configured according to a mutual resonant relationship. When the resonant frequency of the receiver 108 and the resonant frequency of the transmitter 104 are substantially the same or very close, transmission losses between the transmitter 104 and the receiver 108 are reduced. As such, wireless power transfer may be provided over larger distances. Resonant inductive coupling techniques may thus allow for improved efficiency and power transfer over various distances and with a variety of inductive power transmitting and receiving element configurations.

In certain aspects, the wireless field 105 may correspond to the "near field" of the transmitter 104. The near-field may correspond to a region in which there are strong reactive fields resulting from the currents and charges in the power transmitting element 114 that minimally radiate power away from the power transmitting element 114. The near-field may correspond to a region that is within about one wavelength (or a fraction thereof) of the power transmitting element 114. Conversely, the far field may correspond to a region that is greater than about one wavelength of the power transmitting element 114.

In certain aspects, efficient energy transfer may occur by coupling a large portion of the energy in the wireless field 105 to the power receiving element 118 rather than propagating most of the energy in an electromagnetic wave to the far field.

In certain implementations, the transmitter 104 may output a time varying magnetic (or electromagnetic) field with a frequency corresponding to the resonant frequency of the power transmitting element 114. When the receiver 108 is within the wireless field 105, the time varying magnetic (or electromagnetic) field may induce a current in the power receiving element 118. As described above, if the power receiving element 118 is configured as a resonant circuit to resonate at the frequency of the power transmitting element 114, energy may be efficiently transferred. An alternating current (AC) signal induced in the power receiving element 118 may be rectified to produce a direct current (DC) signal that may be provided to charge or to power a load.

Figure 2:
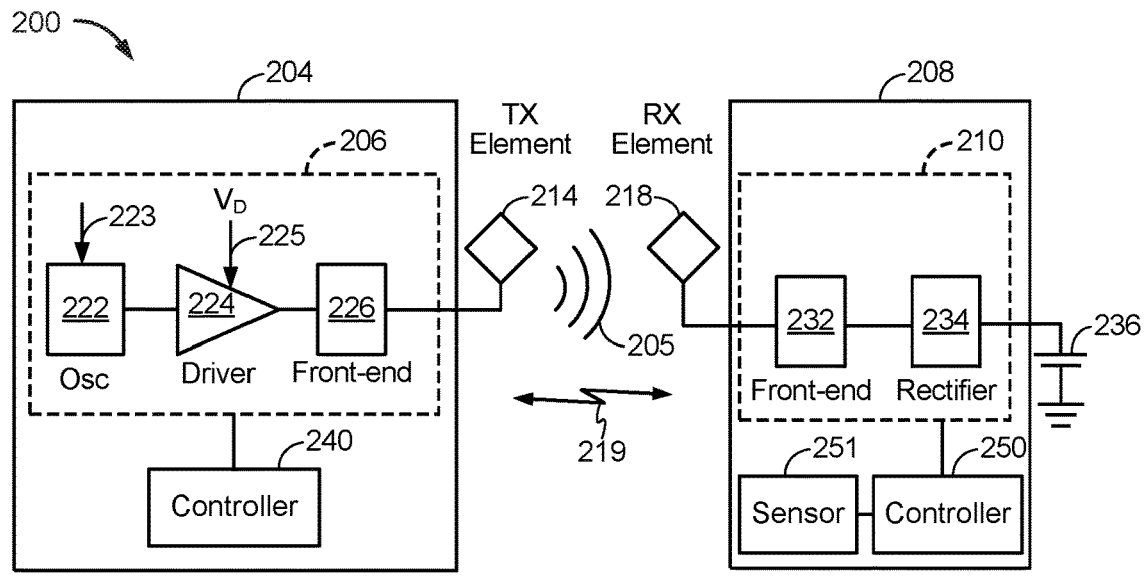
FIG. 2 is a functional block diagram of a wireless power transfer system in accordance with an illustrative aspect.

FIG. 2 is a functional block diagram of a wireless power transfer system 200, in accordance with another illustrative aspect. The system 200 may include a transmitter 204 and a receiver 208. The transmitter 204 (also referred to herein as power transfer unit, PTU) may include transmit circuitry 206 that may include an oscillator 222, a driver circuit 224, and a front-end circuit 226. The oscillator 222 may be configured to generate an oscillator signal (e.g., an oscillating signal) at a desired frequency (e.g., fundamental frequency) that may adjust in response to a frequency control signal 223. The oscillator 222 may provide the oscillator signal to the driver circuit 224. The driver circuit 224 may be configured to drive the power transmitting element 214 at, for example, a resonant frequency of the power transmitting element 214 based on an input voltage signal (VD) 225. The driver circuit 224 may be a switching amplifier configured to receive a square wave from the oscillator 222 and output as a driving signal output a sine wave.

The front-end circuit 226 may include a filter circuit configured to filter out harmonics or other unwanted frequencies. The front-end circuit 226 may include a matching circuit configured to match the impedance of the transmitter 204 to the impedance of the power transmitting element 214.

As will be explained in more detail below, the front-end circuit 226 may include a tuning circuit to create a resonant circuit with the power transmitting element 214. As a result of driving the power transmitting element 214, the power transmitting element 214 may generate a wireless field 205 to wirelessly output power at a level sufficient for charging a battery 236, or otherwise powering a load.

The transmitter 204 may further include a controller 240 operably coupled to the transmit circuitry 206 and configured to control one or more aspects of the transmit circuitry 206, or accomplish other operations relevant to managing the transfer of power. The controller 240 may be a microcontroller or a processor. The controller 240 may be implemented as an application-specific integrated circuit (ASIC). The controller 240 may be operably connected, directly or indirectly, to each component of the transmit circuitry 206. The controller 240 may be further configured to receive information from each of the components of the transmit circuitry 206 and perform calculations based on the received information. The controller 240 may be configured to generate control signals (e.g., signal 223) for each of the components that may adjust the operation of that component. As such, the controller 240 may be configured to adjust or manage the power transfer based on a result of the operations performed by it. The transmitter 204 may further include a memory (not shown) configured to store data, for example, such as instructions for causing the controller 240 to perform particular functions, such as those related to management of wireless power transfer.

The receiver 208 (also referred to herein as power receiving unit, PRU) may include receive circuitry 210 that may include a front-end circuit 232 and a rectifier circuit 234. The front-end circuit 232 may include matching circuitry configured to match the impedance of the receive circuitry 210 to the impedance of the power receiving element 218. As will be explained below, the front-end circuit 232 may further include a tuning circuit to create a resonant circuit with the power receiving element 218. The rectifier circuit 234 may generate a DC power output from an AC power input to charge the battery 236, as shown in FIG. 2. The receiver 208 and the transmitter 204 may additionally communicate on a separate communication channel 219 (e.g., Bluetooth, Zigbee, cellular, etc.). The receiver 208 and the transmitter 204 may alternatively communicate via in-band signaling using characteristics of the wireless field 205.

The receiver 208 may be configured to determine whether an amount of power transmitted by the transmitter 204 and received by the receiver 208 is appropriate for charging the battery 236. In certain aspects, the transmitter 204 may be configured to generate a predominantly non-radiative field with a direct field coupling coefficient (k) for providing energy transfer. Receiver 208 may directly couple to the wireless field 205 and may generate an output power for storing or consumption by a battery (or load) 236 coupled to the output or receive circuitry 210.

The receiver 208 may further include a controller 250 configured similarly to the transmit controller 240 as described above for managing one or more aspects of the wireless power receiver 208. The receiver 208 may further include a memory (not shown) configured to store data, for example, such as instructions for causing the controller 250 to perform particular functions, such as those related to management of wireless power transfer.

As discussed above, transmitter 204 and receiver 208 may be separated by a distance and may be configured according to a mutual resonant relationship to minimize transmission losses between the transmitter 204 and the receiver 208.

Figure 3:
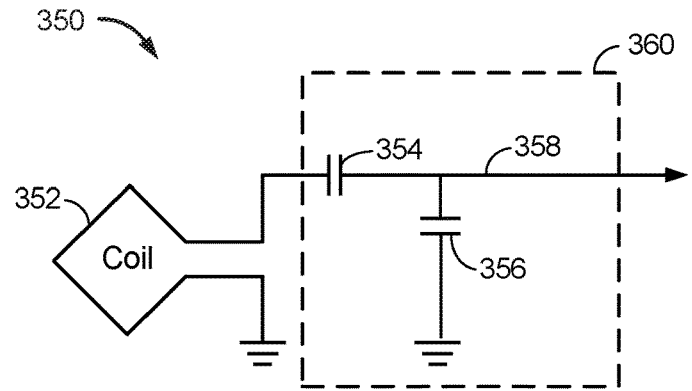
FIG. 3 is a schematic diagram of a portion of transmit circuitry or receive circuitry of FIG. 2 including a power transmitting or receiving element in accordance with an illustrative aspect.

FIG. 3 is a schematic diagram of a portion of the transmit circuitry 206 or the receive circuitry 210 of FIG. 2, in accordance with illustrative aspects. As illustrated in FIG. 3, transmit or receive circuitry 350 may include a power transmitting or receiving element 352 and a tuning circuit 360. The power transmitting or receiving element 352 may also be referred to or be configured as an antenna or a "loop" antenna. The term "antenna" generally refers to a component that may wirelessly output or receive energy for coupling to another antenna. The power transmitting or receiving element 352 may also be referred to herein or be configured as a "magnetic" antenna, or an induction coil, a resonator, or a portion of a resonator. The power transmitting or receiving element 352 may also be referred to as a coil or resonator of a type that is configured to wirelessly output or receive power. As used herein, the power transmitting or receiving element 352 is an example of a "power transfer component" of a type that is configured to wirelessly output and/or receive power. The power transmitting or receiving element 352 may include an air core or a physical core such as a ferrite core (not shown in this figure).

When the power transmitting or receiving element 352 is configured as a resonant circuit or resonator with tuning circuit 360, the resonant frequency of the power transmitting or receiving element 352 may be based on the inductance and capacitance. Inductance may be simply the inductance created by a coil and/or other inductor forming the power transmitting or receiving element 352. Capacitance (e.g., a capacitor) may be provided by the tuning circuit 360 to create a resonant structure at a desired resonant frequency. As a non limiting example, the tuning circuit 360 may comprise a capacitor 354 and a capacitor 356, which may be added to the transmit and/or receive circuitry 350 to create a resonant circuit.

The tuning circuit 360 may include other components to form a resonant circuit with the power transmitting or receiving element 352. As another non limiting example, the tuning circuit 360 may include a capacitor (not shown) placed in parallel between the two terminals of the circuitry 350. Still other designs are possible. In some aspects, the tuning circuit in the front-end circuit 226 may have the same design (e.g., 360) as the tuning circuit in front-end circuit 232. In other aspects, the front-end circuit 226 may use a tuning circuit design different than in the front-end circuit 232.

For power transmitting elements, the signal 358, with a frequency that substantially corresponds to the resonant frequency of the power transmitting or receiving element 352, may be an input to the power transmitting or receiving element 352. For power receiving elements, the signal 358, with a frequency that substantially corresponds to the resonant frequency of the power transmitting or receiving element 352, may be an output from the power transmitting or receiving element 352.

Although aspects disclosed herein may be used in systems related to resonant wireless power transfer, persons of ordinary skill will appreciate that aspects disclosed herein may be used in other non-resonant implementations for wireless power transfer, and in wired power applications, such as those described above. In particular, some aspects herein relate to limiting the power drawn by a battery charger based on monitoring of the input voltage and input current supplied to the battery charger from a power supply. For example, certain aspects herein relate to controlling power drawn by a battery charger used to charge a battery based on an input voltage from a power supply (e.g., a wireless power receiver).

In certain aspects, the induced voltage at a wireless power receiver (e.g., receiver 208) due to a wireless field (e.g., wireless field 205 generated by a wireless power transmitter (e.g., transmitter 204) may vary. For example, the coupling between the wireless power receiver 208 and the wireless power transmitter 204 may change due to distance or material between the receiver 208 and the transmitter 204, leading to variations in induced voltage at the receiver 208.

Certain devices (e.g., charge ports of mobile devices, battery operated devices, etc.) may be configured to only accept a limited range of voltages (e.g., 4-10V, 4-12V, etc.). Since the induced voltage at the receiver 208 may vary due to the variable mutual inductance between the transmitter 204 and the receiver 208, circuits may be used to scale the voltage of the receiver 208. Further, a power supply may have a maximum power it can supply, and a battery charger may have a maximum power it can receive as input. Since the voltage at the receiver 208 may vary, the current output by the power supply and input to the battery charger may need to be controlled to ensure the power limits are not exceeded.

FIG. 4 illustrates a battery charging system 400 including a buck converter, in accordance with certain aspects. As shown, the charging system 400 includes a power supply 405 (e.g., receiver 208) and a battery charger 455. The acceptable input voltage range of the battery charger 455 may be limited (e.g., 4-10V, 4-12V, etc.).

The power supply 405 generates a power signal shown as having a voltage $V_{RECT}$. For example, where the power supply 405 comprises a wireless power receiver such as receiver 208, the power signal with voltage $V_{RECT}$ may be generated by the rectifier 234, as described herein. The power supply 405 further includes a sensing circuit 410 configured to sense the voltage level and current of the power signal generated. The power supply 405 further includes a buck converter 415 that receives the power signal and limits a voltage and current of the power signal as output by the buck converter 415. The buck converter 415 includes a control circuit 417, a gate driver 419, and transistors 421 coupled in series. The control circuit 417 receives information from the sensing circuit 410 as to the voltage $V_{RECT}$ of the power signal and current of the power signal and controls the gate driver 419 to selectively open and close transistors 421 to limit the voltage output and current output by the buck converter 415, and accordingly the voltage output and current output by the power supply 405. In particular, the buck converter 415 limits the output voltage to a voltage within an acceptable range and a current output to a current within an acceptable range (e.g., based on a power limit for the battery charger 455 and for the power supply 405). The output of the buck converter 415 is further coupled to an inductor 425, which is coupled to an input of the battery charger 455. The inductor 425 may ensure the input voltage at the battery charger 455 is within the acceptable range. The battery charger 455 itself further includes a buck converter 460 shown as a series of transistors 462. The buck converter 460 may further control the voltage and current applied to a battery (e.g., battery 236) to charge the battery. The output of the buck converter 460 is further coupled to an inductor 465, which is coupled to an input of the battery. The inductor 465 ensures the input voltage at the battery is within the desired voltage range. Accordingly, the battery charging system 400 includes cascaded buck converters 415 and 460, in order to control the voltage and current output by the battery charger 455 to a battery (e.g., battery 236). These cascaded buck converters 415 and 460, along with two inductors 415 and 465 may be costly (e.g., require large silicon area to implement) and further may suffer from significant losses (e.g., power losses, power efficiency of 90% or less) and heat dissipation due to the current control performed by both the buck converter 415 and the buck converter 460.

FIG. 5 illustrates a battery charging system 500 including an open loop charge pump, in accordance with certain aspects. As shown, the charging system 500 includes a power supply 505 (e.g., receiver 208) and a battery charger 555. The acceptable input voltage range of the battery charger 555 may be limited (e.g., 4-10V, 4-12V, etc.).

The power supply 505 generates a power signal shown as having a voltage $V_{RECT}$. For example, where the power supply 505 comprises a wireless power receiver such as receiver 208, the power signal with voltage $V_{RECT}$ may be generated by the rectifier 234, as described herein. The power supply 505 further includes a sensing circuit 510 configured to sense the voltage level and current of the power signal generated. The power supply 505 further includes an open loop charge pump 515 (e.g., divide by two charge pump) that receives the power signal and limits a voltage and current of the power signal as output by the charge pump 515.

In certain aspects, the charge pump 515 may operate in a divide-by-two mode, where the output voltage Vout of the charge pump 515 is half of the input voltage Vin of the charge pump 515 (Vout=Vin/2). In certain aspects, the charge pump 515 may operate in a bypass mode where the output voltage Vout of the charge pump 400 is equal to the input voltage Vin.

As shown, the charge pump 515 includes transistors 517. In some aspects, gate terminals of each of the transistors 517 may be coupled to control signals (e.g., from a controller, such as, a PMIC, processor, controller 250, etc.) to control the opening and closing of transistors 517. The controller receives information from the sensing circuit 510 as to the voltage $V_{RECT}$ of the power signal and current of the power signal and controls the transistors 517 to limit the voltage output and current output by the charge pump 515, and accordingly the voltage output and current output by the power supply 505 to the battery charger 555. In particular, the charge pump 515 limits the output voltage to a voltage within an acceptable range and a current output to a current within an acceptable range (e.g., based on a power limit for the battery charger 555). However, in order to limit the output voltage and output current, the charge pump 515 may need to receive feedback (e.g., input power limit) from the battery charger 555, and the battery charger may need to support input power limit. Therefore, design of the charge pump 515 may need to be tightly coupled with design of the battery charger 555, which adds complexity and cost to design of the charging system 500.

Accordingly, to overcome some of the limitations of charging system 400 and 500, and other similar charging systems, certain aspects described herein provide for controlling an output current of a battery charger used to charge a battery based on an input voltage from a power supply (e.g., a wireless power receiver).

FIG. 6 illustrates a battery charging system 600 including a feed forward control system, in accordance with certain aspects. As shown, the charging system 600 includes a power supply 605 (e.g., receiver 208) and a battery charger 655. The acceptable input voltage range of the battery charger 655 may be limited (e.g., 4-10V, 4-12V, etc.).

The power supply 605 generates a power signal shown as having a voltage $V_{RECT}$. For example, where the power supply 605 comprises a wireless power receiver such as receiver 208, the power signal with voltage $V_{RECT}$ may be generated by the rectifier 234, as described herein. The power supply 605 further includes a sensing and control circuit 610 configured to sense the current and voltage of the power signal generated. In some aspects, the power supply 605 further includes a voltage limiter 615 (e.g., charge pump, buck converter, variable capacitor, impedance transformer, etc.) that is configured to limit the voltage output of the power supply 605. In some aspects, the power supply may not, however, limit a current output of the power supply 605. Further, the voltage limiter 615 may be configured to limit the output voltage of the power supply 605 to a range, but not necessarily a fixed voltage. In some aspects, the voltage limiter 615 is configured to operate in a bypass mode if $V_{RECT}$ is below a maximum operating voltage of the battery charger 655, and operate in a step down mode (e.g., divide by 2 mode) to limit the voltage when $V_{RECT}$ is above a maximum operating voltage of the battery charger 655.

In some aspects, if the power supply 605 already has an acceptable voltage output limit (e.g., based on a design of receiver 208, $V_{RECT}$ is already limited to the acceptable input voltage range of battery charger 655) the power supply 605 may not include the voltage limiter 615.

The battery charger 655, similar to battery charger 455, includes a buck converter 660 (or other appropriate regulator). The buck converter 660 includes an interface 657 (e.g., a pulse-width modulation (PWM) comparator), a gate driver 659, and transistors 661 coupled in series. The interface 657 provides the gate driver 659 a signal to selectively open and close transistors 661 to limit the power output (e.g., voltage and current output) by the buck converter 660 (e.g., by performing power and impedance limiting), and accordingly the power output by the battery charger 655. In particular, in certain aspects, the signal provided by the interface 657 is controlled by a feed forward control signal from sensing and control circuit 610. In certain aspects, the logic for controlling the selective opening and closing of transistors 661 (e.g., for generating the feed forward control signal) to limit the power output by the buck converter 660 is implemented in the sensing and control circuit 610 as further discussed herein. For example, the interface 657 may be configured to receive a signal from the sensing and control circuit 610 and convert the signal to one that drives the gate driver 659. For example, the gate driver 659 may be configured to operate based on a pulse-width modulated signal. Accordingly, the interface 657 may be configured to generate a pulse-width modulated waveform with a duty cycle that is proportional (e.g., inversely proportional) to the signal received from the sensing and control circuit 610 and apply the waveform to the gate driver 659.

The sensing and control circuit 610 may be configured to generate (e.g., in whole or in part) a feed forward control signal and send the signal on line 617 to the battery charger 655 to control the power usage of the battery charger 655 based on an output voltage of the power supply 605. In particular, as discussed, the power supply 605 may have a maximum power output (POUT_MAX) that it can supply, and the battery charger 655 may have a maximum power input (PIN_MAX) it can handle. Accordingly, the power usage of the battery charger 655 may be controlled to ensure that the power limits are met. In particular, in some aspects, the feed forward control signal is configured to control the battery charger 655 to limit the current drawn by the battery charger 655 to ensure the power limits are met. Further, as discussed above, in some aspects, the output voltage of the power supply 605 is not fixed, and therefore may vary. Accordingly, in certain aspects, the feed forward control signal is based on the output voltage to ensure the current used by the battery charger 655 for the actual output voltage meets the power limits.

Accordingly the battery charging system 600 can operate in an open loop design (e.g., based on the current loop control) to operate more efficiently than battery charging system 400, and without added complexity like battery charging system 500. Further, since the battery charging system 600 can operate with a variable output voltage for the power supply 605, in some aspects, the output voltage may be selected to operate in an optimal range for the battery charger 655, thereby further increasing efficiency. In addition, in some aspects, the battery charger 655 and power supply 605 do not need to be specifically designed for each other (e.g., to have specific voltage inputs and output) as the feed forward control signal ensures proper operation even with variable voltages.

In certain aspects, a control loop error amplifier 670, as shown in FIG. 6A, is used to generate a signal as input to interface 657 to set the current drawn by battery charger 655. In particular, a first input of the control loop error amplifier 670 is coupled to a line carrying a signal with a voltage level indicative of the current sensed by sensing and control circuit 610. Further, a second input of the control loop error amplifier 670 is coupled to a line carrying a reference signal with a reference voltage VREF. VREF may be selected (e.g., programmed, set, etc.) such that the control loop error amplifier 670 ensures that the current drawn by the battery charger 655 does not exceed the power limit of either the battery charger 655 or the power supply 605.

For example, in certain aspects, VREF is configured based on maximum power input PIN_MAX and a minimum input voltage (DCIN_MIN) for the battery charger 655 to represent the maximum input current for the battery charger 655. For example, if PIN_MAX is 10 W and DCIN_MIN is 5V, VREF is configured to represent the maximum input current of 2A for the battery charger 655. Depending on the design of battery charger 655, M volts of VREF may correspond to N amps drawn by the battery charger 655 (e.g., 100 mV corresponds to 100 mA), and therefore VREF is set to (M/N)*(PIN MAX/DCIN_MIN) (e.g., 2V). In particular, in certain aspects, the correspondence of M and N may be based on the assumption that the input voltage to the battery charger 655 is DCIN_MIN. Accordingly, in certain aspects the selection of VREF for the control loop error amplifier 670 is independent of the power supply 605 (e.g., the power limit and voltage supplied by the power supply 605).

Based on the selection of VREF as discussed, if the actual voltage supplied by the power supply 605 to the battery charger 655 is DCIN_MIN, and the power supply has a POUT_MAX equal to PIN_MAX, then the described correspondence of voltage M to current N holds true. Accordingly, the control loop error amplifier 670 can use the actual sensed current from sensing and control circuit 610 to properly limit current drawn by the battery charger 655 to not exceed the power limit of the battery charger 655 or the power supply 605. However, if the actual voltage supplied by the power supply 605 is not DCIN_MIN and/or POUT_MAX is not equal to PIN MAX, then using the actual sensed current may lead to the control loop error amplifier 670 improperly limiting current drawn by the battery charger 655.

Accordingly, in certain aspects, the signal on the line coupled to the first input of the control loop error amplifier 670 is indicative of a scaled current sensed by sensing and control circuit 610. In particular, the current sensed by sensing and control circuit 610 is scaled by a scaling factor equal to the maximum input current to the battery charger 655 divided by the maximum output current of the power supply 605, which is:

(PIN_MAX/DCIN_MAX)/(POUT_MAX/VOUT), where VOUT is the actual voltage supplied by the power supply 605. The scaling may be performed, for example, by a scaled current mirror coupled to a current sensing circuit, each of which are implemented in the sensing and control circuit 610. Accordingly, the current sensed by the sensing and control circuit 610 is scaled based on the output voltage of the power supply 605, and the scaled current is used by the control loop error amplifier 670 to control the current of the battery charger 655. Accordingly, the current drawn by the battery charger 655 is controlled based on the current sensed at power supply 605, which is scaled based on the output voltage of the power supply 605. By using the scaled current instead of the actual current sensed at power supply 605, the current drawn by the battery charger 655 can be properly controlled even if the actual voltage supplied by the power supply 605 is not DCIN_MIN and/or POUT_MAX is not equal to PIN_MAX.

Figures 6B, 6C:
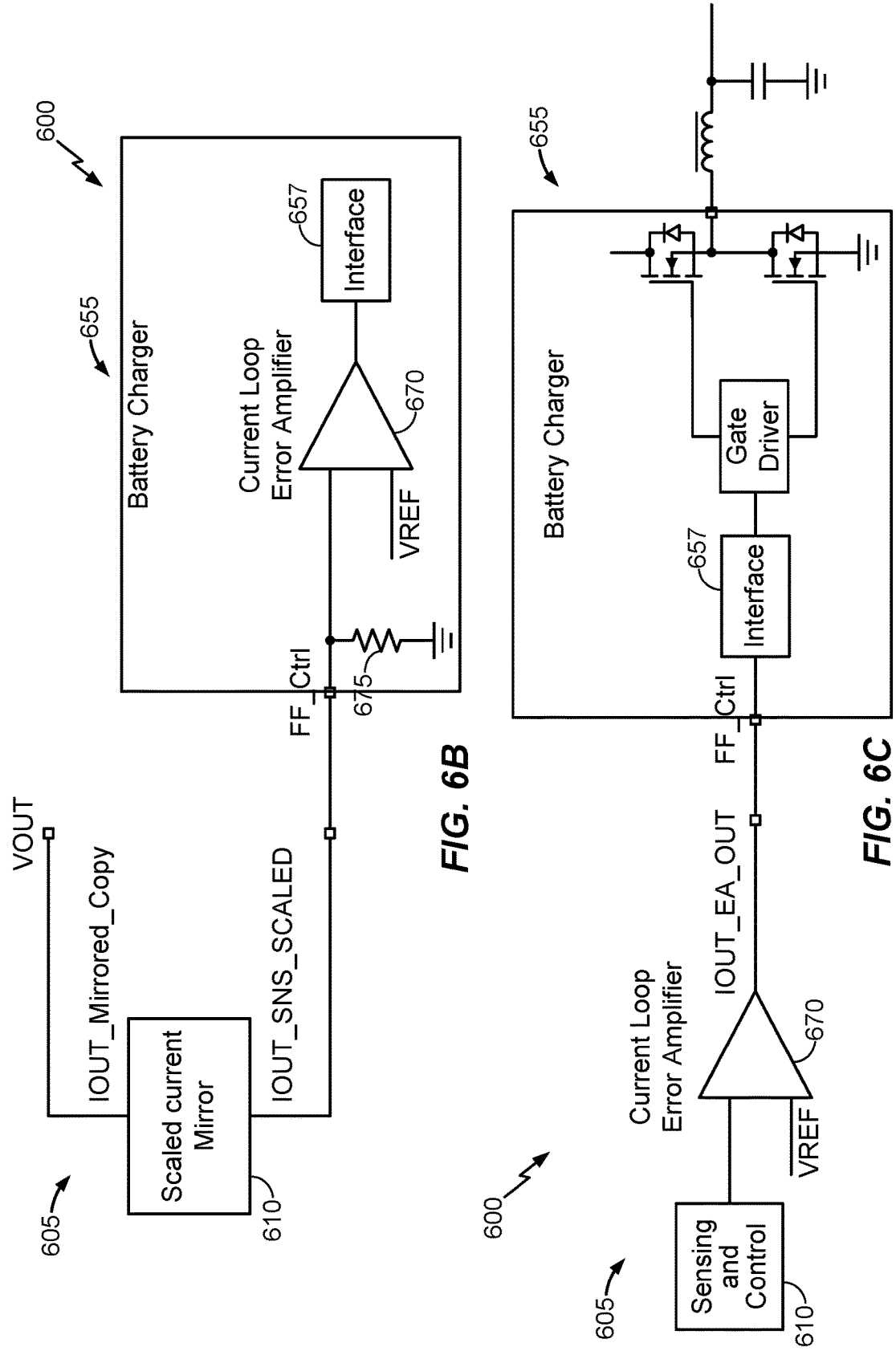
FIG. 6B illustrates an example implementation of the battery charging system of FIG. 6, in accordance with certain aspects.
FIG. 6C illustrates another example implementation of the battery charging system of FIG. 6, in accordance with certain aspects.

In certain aspects, the control loop error amplifier 670 is implemented in the battery charger 655, such as shown in FIG. 6B. In such aspects, the feed forward control signal generated by control circuit 610 may be indicative of the scaled current generated by the sensing and control circuit 610. For example, in the example shown in FIG. 6B, the feed forward control signal is the scaled current (e.g., a current based control signal), which is converted to an appropriate voltage signal at battery charger 655 with a resistor 675 coupled to the line carrying the signal to the control loop error amplifier 670. In some aspects, the resistor 675 may be implemented at the power supply 605 instead of the battery charger 655, and the feed forward control signal sent from the power supply 605 to the battery charger 655 may be the appropriate voltage signal (e.g., a voltage based control signal).

In certain aspects, the control loop error amplifier 670 is implemented in the power supply 605, such as shown in FIG. 6C. In such aspects, the feed forward control signal from the power supply 605 to the battery charger 655 may be the output signal of the control loop error amplifier 670 and directly coupled to interface 657. Such an output signal may still be based on the scaled current as discussed. Though resistor 675 is not shown in FIG. 6C, it may be implemented in sensing and control circuit 610.

In certain aspects, the sensing and control circuit 610 may fully implement a current control loop as discussed herein and generate a pulse width modulation (PWM) signal to directly control the transistors 661.

Figure 7:
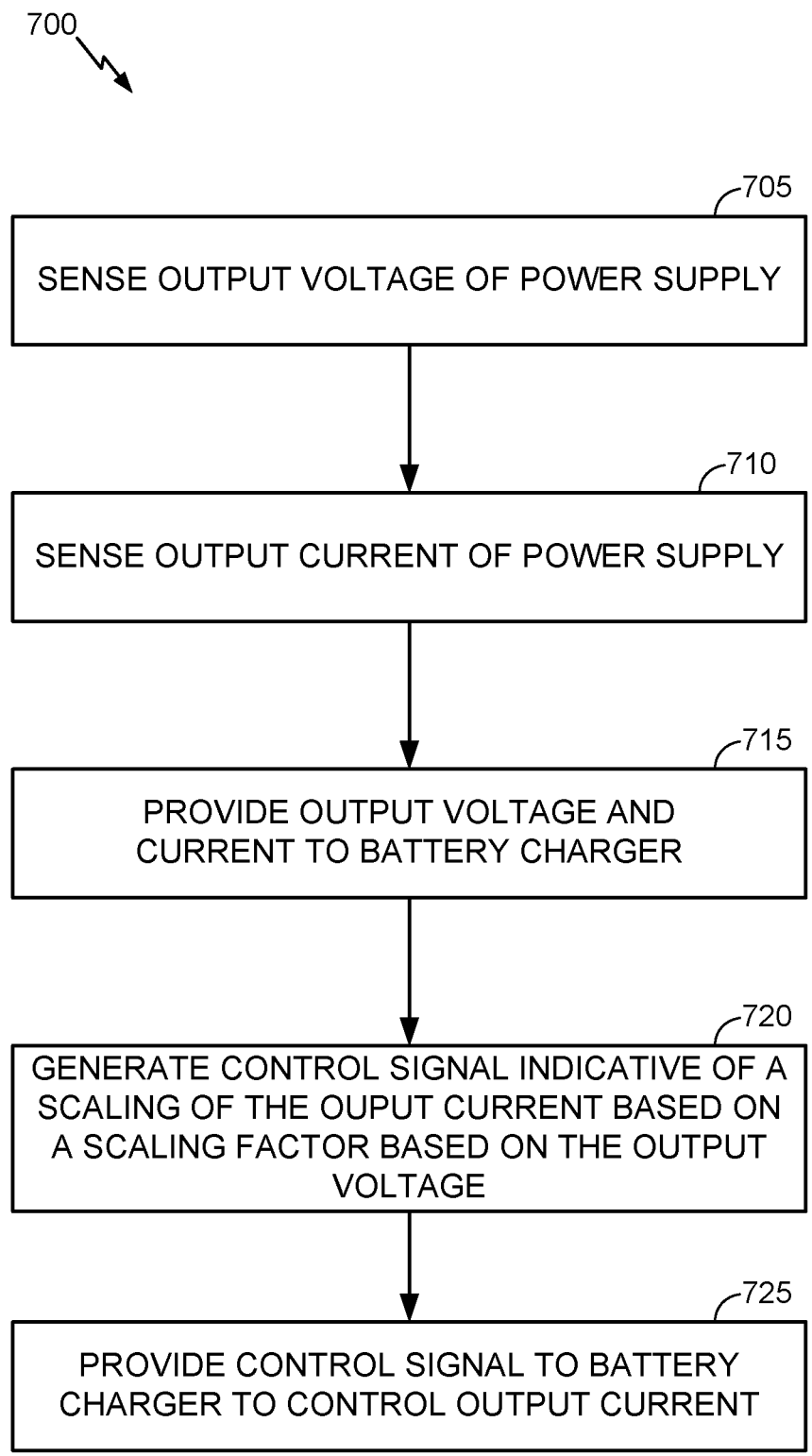
FIG. 7 is a flowchart of example operations for operating a battery charging system including a feed forward control system, in accordance with certain aspects of the present disclosure.

FIG. 7 is a flowchart of example operations 700 for operating a battery charging system including a feed forward control system, in accordance with certain aspects of the present disclosure.

At 705, a power supply senses an output voltage of the power supply to a battery charger. Further, at 710, the power supply senses an output current of the power supply to the battery charger.

At 715, the power supply provides the output voltage and the output current to the battery charger. At 720, the power supply generates a control signal for controlling the output current by the battery charger. In some aspects, as discussed, the control signal is indicative of a scaling of the output current based on a scaling factor. The scaling factor is based on the output voltage. At 725, the power supply provides the control signal to the battery charger to control the output current. For example, the battery charger, in some aspects, utilizes the scaled current to control the current drawn by the battery charger, such as to comply with power limits of the power supply and the battery charger.

The various operations of methods described above may be performed by any suitable means capable of performing the corresponding functions. The means may include various hardware and/or software component(s) and/or module(s), including, but not limited to a circuit, an application-specific integrated circuit (ASIC), or processor. Generally, where there are operations illustrated in figures, those operations may have corresponding counterpart means-plus-function components with similar numbering.

As used herein, the term "determining" encompasses a wide variety of actions. For example, "determining" may include calculating, computing, processing, deriving, investigating, looking up (e.g., looking up in a table, a database, or another data structure), ascertaining, and the like. Also, "determining" may include receiving (e.g., receiving information), accessing (e.g., accessing data in a memory), and the like. Also, "determining" may include resolving, selecting, choosing, establishing, and the like.

As used herein, a phrase referring to "at least one of" a list of items refers to any combination of those items, including single members. As an example, "at least one of: a, b, or c" is intended to cover: a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

The various illustrative logical blocks, modules and circuits described in connection with the present disclosure may be implemented or performed with a general purpose processor, a digital signal processor (DSP), an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the physical (PHY) layer. In the case of a user terminal, a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processing system may be configured as a general-purpose processing system with one or more microprocessors providing the processor functionality and external memory providing at least a portion of the machine-readable media, all linked together with other supporting circuitry through an external bus architecture. Alternatively, the processing system may be implemented with an ASIC with the processor, the bus interface, the user interface in the case of an access terminal), supporting circuitry, and at least a portion of the machine-readable media integrated into a single chip, or with one or more FPGAs, PLDs, controllers, state machines, gated logic, discrete hardware components, or any other suitable circuitry, or any combination of circuits that can perform the various functionality described throughout this disclosure. Those skilled in the art will recognize how best to implement the described functionality for the processing system depending on the particular application and the overall design constraints imposed on the overall system.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for supplying power to a battery charger, the method comprising:
   sensing an output voltage of a power supply, wherein the output voltage of the power supply is variable;
   sensing an output current of the power supply;
   providing the output voltage and output current to the battery charger;
   generating a control signal indicative of a scaling of the output current based on a scaling factor, wherein the scaling factor is based on the output voltage; and
   providing the control signal to the battery charger to control the output current drawn from the power supply by the battery charger.

2. The method of claim 1, wherein the power supply comprises a wireless power receiver, and further comprising generating the output voltage by coupling the wireless power receiver to a wireless power field.

3. The method of claim 2, wherein the wireless power receiver comprises a resonator and a rectifier.

4. The method of claim 1, further comprising:
   generating a supply voltage; and
   limiting the supply voltage to the output voltage based on an operating parameter of the battery charger.

5. The method of claim 4, wherein limiting the supply voltage is performed by at least one of a buck converter, a charge pump, or a variable capacitor.

6. The method of claim 1, wherein the scaling factor is further based on a minimum input voltage for the battery charger, a power limit of the battery charger, and a power limit of the power supply.

7. The method of claim 1, wherein the control signal comprises a pulse width modulation signal for controlling one or more transistors of the battery charger.

8. The method of claim 1, further comprising scaling the output current using a current mirror.

9. The method of claim 1, further comprising setting a reference voltage for controlling the output current drawn by the battery charger based on a power limit of the battery charger and a minimum input voltage for the battery charger.

10. The method of claim 9, wherein the control signal is based on a difference between the reference voltage and a voltage corresponding to the scaled output current.

11. A power supply for supplying power to a battery charger, the power supply comprising:
    an output terminal configured to provide an output voltage and output current to the battery charger;
    a sensing circuit configured to sense the output voltage and the output current; and
    a control circuit configured to generate a control signal indicative of a scaling of the output current based on a scaling factor, wherein the scaling factor is based on the output voltage, and provide the control signal to the battery charger to control the output current to the battery charger.

12. The power supply of claim 11, further comprising a wireless power receiver configured to generate the output current and the output voltage by coupling to a wireless power field.

13. The power supply of claim 12, wherein the wireless power receiver comprises a resonator and a rectifier.

14. The power supply of claim 11, further comprising a voltage limiter configured to limit a supply voltage to the output voltage based on an operating parameter of the battery charger.

15. The power supply of claim 14, wherein the voltage limiter comprises at least one of a buck converter, a charge pump, or a variable capacitor.

16. The power supply of claim 11, wherein the scaling factor is further based on a minimum input voltage for the battery charger, a power limit of the battery charger, and a power limit of the power supply.

17. The power supply of claim 11, wherein the control signal comprises a pulse width modulation signal for controlling one or more transistors of the battery charger.

18. The power supply of claim 11, further comprising a current mirror configured to scale the output current based on the output voltage.

19. The power supply of claim 11, further comprising an error amplifier configured to generate the control signal based on a difference between a reference voltage and a voltage based on the output voltage and the output current.

20. The power supply of claim 19, wherein the reference voltage is based on a power limit of the battery charger and a minimum input voltage for the battery charger.

21. A power supply for supplying power to a battery charger, the power supply comprising:
    means for sensing an output voltage of the power supply, wherein the output voltage of the power supply is variable;
    means for sensing an output current of the power supply;
    means for providing the output voltage and output current to the battery charger;
    means for generating a control signal indicative of a scaling of the output current based on a scaling factor, wherein the scaling factor is based on the output voltage; and
    means for providing the control signal to the battery charger to control the output current drawn from the power supply by the battery charger.

22. The power supply of claim 21, further comprising means for generating the output voltage by coupling to a wireless power field.

23. The power supply of claim 21, further comprising:
means for generating a supply voltage; and
means for limiting the supply voltage to the output voltage based on an operating parameter of the battery charger.

24. The power supply of claim 21, wherein the scaling factor is further based on a minimum input voltage for the battery charger, a power limit of the battery charger, and a power limit of the power supply.

25. The power supply of claim 21, further comprising means for setting a reference voltage for controlling the output current by the battery charger based on a power limit of the battery charger and a minimum input voltage for the battery charger.

26. A non-transitory computer readable medium having instructions stored thereon for causing a power supply to perform a method for supplying power to a battery charger, the method comprising:
sensing an output voltage of the power supply, wherein the output voltage of the power supply is variable;
sensing an output current of the power supply;
providing the output voltage and output current to the battery charger;
generating a control signal indicative of a scaling of the output current based on a scaling factor, wherein the scaling factor is based on the output voltage; and
providing the control signal to the battery charger to control the output current drawn from the power supply by the battery charger.

27. The non-transitory computer readable medium of claim 26, wherein the method further comprises generating the output voltage by coupling to a wireless power field.

28. The non-transitory computer readable medium of claim 26, wherein the method further comprises:
generating a supply voltage; and
limiting the supply voltage to the output voltage based on an operating parameter of the battery charger.

29. The non-transitory computer readable medium of claim 26, wherein the scaling factor is further based on a minimum input voltage for the battery charger, a power limit of the battery charger, and a power limit of the power supply.

30. The non-transitory computer readable medium of claim 26, wherein the method further comprises setting a reference voltage for controlling the output current by the battery charger based on a power limit of the battery charger and a minimum input voltage for the battery charger.

* * * * *